United States Patent
Bharti et al.

(10) Patent No.: US 10,042,614 B1
(45) Date of Patent: Aug. 7, 2018

(54) HARDWARE DEVICE BASED SOFTWARE GENERATION

(71) Applicant: INTERNATIONAL BUSINESS MACHINES CORPORATION, Armonk, NY (US)

(72) Inventors: Harish Bharti, Pune (IN); Rajesh K. Saxena, Thane East (IN); Balakrishnan Sreenivasan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/473,018

(22) Filed: Mar. 29, 2017

(51) Int. Cl.
 *G06F 9/445* (2018.01)
 *G06F 8/20* (2018.01)
 *G06F 8/70* (2018.01)

(52) U.S. Cl.
 CPC . *G06F 8/20* (2013.01); *G06F 8/70* (2013.01)

(58) Field of Classification Search
 CPC ....................................................... G06F 9/445
 USPC ................................................ 717/174–178
 See application file for complete search history.

(56) References Cited

U.S. PATENT DOCUMENTS

| | | | |
|---|---|---|---|
| 7,117,351 B2 | 10/2006 | O'Connor et al. | |
| 7,657,542 B2* | 2/2010 | Sundararajan | G06F 8/10 707/827 |
| 8,639,487 B1 | 1/2014 | Ezer et al. | |
| 8,719,776 B2 | 5/2014 | Eteminan et al. | |
| 8,799,436 B2 | 8/2014 | Ayachitula et al. | |
| 8,875,091 B1 | 10/2014 | Rouleau et al. | |
| 9,009,193 B2 | 4/2015 | Callery et al. | |
| 9,009,694 B2 | 4/2015 | Dirico | |
| 9,032,373 B1 | 5/2015 | Gupta et al. | |
| 9,473,931 B2* | 10/2016 | Payyappilly | H04W 4/00 |
| 9,720,799 B1 | 8/2017 | Lachwani et al. | |
| 9,742,619 B2 | 8/2017 | Andreev et al. | |
| 2006/0150143 A1 | 7/2006 | Andreev et al. | |
| 2006/0156274 A1 | 7/2006 | Andreev et al. | |
| 2007/0300204 A1 | 12/2007 | Andreev et al. | |
| 2009/0119545 A1* | 5/2009 | Pham | G06F 11/0709 714/39 |

(Continued)

FOREIGN PATENT DOCUMENTS

JP 2011197799 10/2011

OTHER PUBLICATIONS

Bandor, Michael S.; Quantitative Methods for Software Selection and Evaluation; Carnegie Mellon University Technical Note, Acquisition Support Program; Sep. 2006; 23 pages.

(Continued)

*Primary Examiner* — Jae Jeon
(74) *Attorney, Agent, or Firm* — Schmeiser, Olsen & Watts; John Pivnichny

(57) ABSTRACT

A method and system for improving an operation of an automated IT system is provided. The method includes identifying a minimum set of software applications associated with requirements of processes executed by a hardware device with respect to an IT system. A list of sub-features associated with software based solutions is generated and associated evaluation code is generated. Software features are identified and software operational solutions are generated. Gating criteria adjustment code for selecting additional software applications is generated and executed resulting in improved operation of the hardware device.

20 Claims, 7 Drawing Sheets

(56) References Cited

U.S. PATENT DOCUMENTS

| | | |
|---|---|---|
| 2009/0124241 A1* | 5/2009 | Krishnaswamy ...... G06Q 30/02 455/414.2 |
| 2009/0307660 A1 | 12/2009 | Srinivasan |
| 2010/0031247 A1 | 2/2010 | Arnold et al. |
| 2010/0131928 A1 | 5/2010 | Parthasarathy et al. |
| 2011/0099532 A1 | 4/2011 | Coldicott et al. |
| 2011/0107327 A1 | 5/2011 | Barkie et al. |
| 2011/0154317 A1 | 6/2011 | Madduri et al. |
| 2011/0166849 A1 | 7/2011 | Dube et al. |
| 2012/0180027 A1 | 7/2012 | Yu et al. |
| 2012/0246612 A1 | 9/2012 | Ji et al. |
| 2013/0247022 A1 | 9/2013 | Dejana et al. |
| 2014/0007070 A1 | 1/2014 | Huang et al. |
| 2015/0033208 A1 | 1/2015 | Krishna et al. |
| 2015/0066563 A1 | 3/2015 | McLees et al. |
| 2016/0147518 A1 | 5/2016 | Dimitrakos et al. |

OTHER PUBLICATIONS

Friedman, Mark J.; List of IBM Patents or Patent Applications Treated as Related; Mar. 29, 2017; 1 page.

Lin, Han et al.; COTS Software Selection Process; Sandia National Laboratories; May 2006; 24 pages.

Queenette, Udoh-Ilomechine et al.; Selection Criteria for Computer Software and Hardware: A Case Study of Six University Libraries in Nigeria; Chinese Librarianship: an International Electronic Journal, 32; Aug. 17, 2011; 9 pages.

Rogers, Kishau; 20 Criteria for Selecting Business Software; Websmith Group; Nov. 23, 2011; URL: http://www.websmithgroup.com/blog/business/criteria-forselecting-businesssoftware/; 4 pages.

Li, Yan et al.; A Multiple Criteria Decision Analysis (MCDA) Software Selection Framework; 2014 47th Hawaii International Conference on System Science; Jan. 6-9, 2014; pp. 1084-1094.

Friedman, Mark J.; Updated List of IBM Patents or Patent Applications Treated as Related; May 3, 2018; 1 page.

* cited by examiner

| FEATURES | GATING CRITERIA | KEY FOCUS FOR GATING CRITERIA |
|---|---|---|
| F1 | G1 = 70% (DEGREE OF FITMENT) | SUB FEATURE F1.1, F1.3 |
| F2 | G2 = 50% (DEGREE OF FITMENT) | SUB FEATURE F2.2, F1.5 |
| F3 | G3 = 45% (DEGREE OF FITMENT) | SUB FEATURE F3.1 |
| F4 | G4 = 40% (DEGREE OF FITMENT) | SUB FEATURE F4.2, F4.3 |
| F5 | G5 = 35% (DEGREE OF FITMENT T) | SUB FEATURE F5.2 |
| F6 | G6 = 40% (DEGREE OF FITMENT) | SUB FEATURE F6.1 |
| F7 | G7 = 40% (DEGREE OF FITMENT) | SUB FEATURE F7.2 |

302 → FEATURES
304 → GATING CRITERIA
308 → KEY FOCUS FOR GATING CRITERIA

FIG. 3

HARDWARE DEVICE BASED SOFTWARE GENERATION

FIELD

The present invention relates generally to a method for evaluating software applications and in particular to a method and associated system for improving software technology associated with an operation of a hardware device via generation and combining of software code for improving an efficiency of software and associated hardware devices.

BACKGROUND

Accurately evaluating instructions for operating a device typically includes an inaccurate process with little flexibility. Determining system solutions with respect to operational features of devices may include a complicated process that may be time consuming and require a large amount of resources. Accordingly, there exists a need in the art to overcome at least some of the deficiencies and limitations described herein above.

SUMMARY

A first aspect of the invention provides an automated IT system operational improvement method comprising: identifying, by a processor of a hardware device of an IT system, a minimum set of software applications associated with requirements of processes executed by the hardware device with respect to the IT system, wherein the requirements are comprised by metadata; generating, by the processor based on results of the identifying, a list of sub-features and a minimum fitment criteria associated with software based solutions for modifying the minimum set of software applications; generating, by the processor based on the software based solutions and analyzed database systems, evaluation code for evaluating available software applications of the minimum set of software applications with respect to features of the list of sub-features associated with specified fitment scores; identifying, by the processor, software features for each available software application of the available software applications; generating, by the processor in response to mapping associated data structures to specialized memory devices, software operational solutions for each the available software application; identifying, by the processor, a software operational solution of the software operational solutions, the software operational solution comprising all available features of the software features associated with the minimum set of software applications and comprising a greater number of features than any other software application of the minimum set of software applications; generating, by the processor based on the software operational solution, gating criteria adjustment code for selecting additional software applications of the minimum set of software applications; and executing, by the processor, the gating criteria adjustment code resulting in improved operation of the hardware device.

A second aspect of the invention provides a computer program product, comprising a computer readable hardware storage device storing a computer readable program code, the computer readable program code comprising an algorithm that when executed by a processor of a hardware device of an IT system implements an automated IT system operational improvement method, the method comprising: identifying, by the processor, a minimum set of software applications associated with requirements of processes executed by the hardware device with respect to the IT system, wherein the requirements are comprised by metadata; generating, by the processor based on results of the identifying, a list of sub-features and a minimum fitment criteria associated with software based solutions for modifying the minimum set of software applications; generating, by the processor based on the software based solutions and analyzed database systems, evaluation code for evaluating available software applications of the minimum set of software applications with respect to features of the list of sub-features associated with specified fitment scores; identifying, by the processor, software features for each available software application of the available software applications; generating, by the processor in response to mapping associated data structures to specialized memory devices, software operational solutions for each the available software application; identifying, by the processor, a software operational solution of the software operational solutions, the software operational solution comprising all available features of the software features associated with the minimum set of software applications and comprising a greater number of features than any other software application of the minimum set of software applications; generating, by the processor based on the software operational solution, gating criteria adjustment code for selecting additional software applications of the minimum set of software applications; and executing, by the processor, the gating criteria adjustment code resulting in improved operation of the hardware device.

A third aspect of the invention provides a hardware device of an IT system comprising a processor coupled to a computer-readable memory unit, the memory unit comprising instructions that when executed by the computer processor implements an automated IT system operational improvement method comprising: identifying, by the processor, a minimum set of software applications associated with requirements of processes executed by the hardware device with respect to the IT system, wherein the requirements are comprised by metadata; generating, by the processor based on results of the identifying, a list of sub-features and a minimum fitment criteria associated with software based solutions for modifying the minimum set of software applications; generating, by the processor based on the software based solutions and analyzed database systems, evaluation code for evaluating available software applications of the minimum set of software applications with respect to features of the list of sub-features associated with specified fitment scores; identifying, by the processor, software features for each available software application of the available software applications; generating, by the processor in response to mapping associated data structures to specialized memory devices, software operational solutions for each the available software application; identifying, by the processor, a software operational solution of the software operational solutions, the software operational solution comprising all available features of the software features associated with the minimum set of software applications and comprising a greater number of features than any other software application of the minimum set of software applications; generating, by the processor based on the software operational solution, gating criteria adjustment code for selecting additional software applications of the minimum set of software applications; and executing, by the processor, the gating criteria adjustment code resulting in improved operation of the hardware device.

The present invention advantageously provides a simple method and associated system capable of accurately evaluating instructions for operating a device.

BRIEF DESCRIPTION OF THE DRAWINGS

FIG. 3 illustrates execution of a step of FIG. 2 for generating a list of sub-features and a minimum fitment criteria associated with software based solutions for modifying a minimum set of software applications, in accordance with embodiments of the present invention.

DETAILED DESCRIPTION

Figure 1:
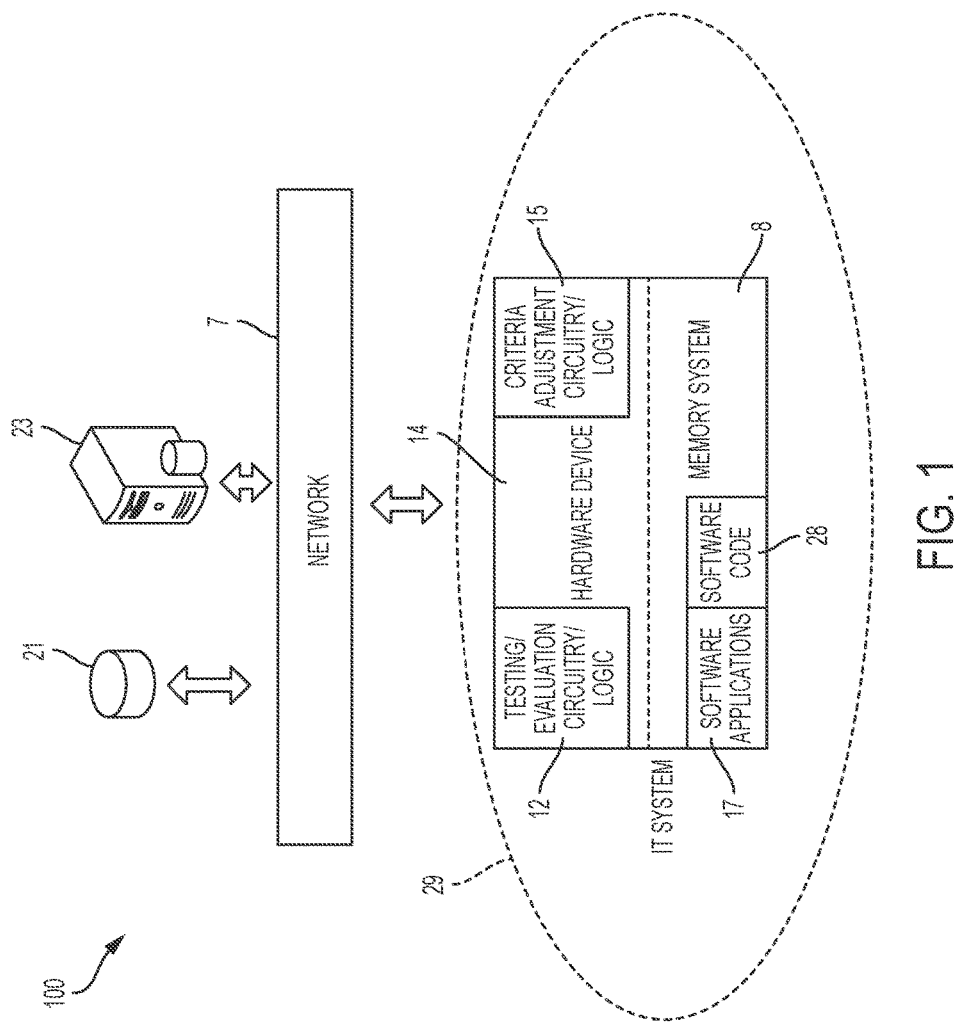
FIG. 1 illustrates a system for improving hardware device operation by generating evaluation and gating criteria adjustment software code for automatically selecting software applications by mapping software requirements with respect to a hardware device, in accordance with embodiments of the present invention.

FIG. 1 illustrates a system 100 for improving hardware device operation by generating evaluation and gating criteria adjustment software code for automatically selecting software applications by mapping software requirements with respect to a hardware device 14, in accordance with embodiments of the present invention. System 100 is enabled to automatically select software for an operational improvement project by mapping software/hardware requirements to IT system frameworks determining associated capabilities and processes System 100 enables a process for improving hardware/software technology by:

1. Selecting a minimum set of software applications associated with capabilities and requirements associated with functional and non-functional attributes for a hardware system/device.

2. Verifying if identified requirement attributes for the hardware system/device are mapped with gated requirements to minimize functionality thereby providing flexibility to fine tune gating criteria enabling optimized software selection.

3. Creating an ordered set of software applications for selecting an applicable software application with respect to a width-fit assortment. The applicable software application is identified such that individual requirements are mapped to the software applications.

System 100 of FIG. 1 includes a server 23 and a database system 21 connected through a network 7 to an IT system comprising a hardware device 14. IT system 29 may comprise a plurality of hardware devices (similar to hardware device 14) and/or any type of IT type of device. Hardware device 14 comprises testing/evaluation circuitry/logic 12, criteria adjustment circuitry/logic 15, and a memory system 8. Memory system 8 comprises software applications 17 and software code 28. Server 23, database system 21, and hardware device 14 each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server 23, database system 21, and hardware device 14 may each comprise a specialized hardware device comprising specialized (non-generic) hardware and circuitry (i.e., specialized discrete non-generic analog, digital, and logic based circuitry) for (independently or in combination) executing a process described with respect to FIGS. 1-3. The specialized discrete non-generic analog, digital, and logic based circuitry (e.g., testing/evaluation circuitry/logic 12, criteria adjustment circuitry/logic 15, etc.) may include proprietary specially designed components (e.g., a specialized integrated circuit, such as for example an Application Specific Integrated Circuit (ASIC) designed for only implementing an automated process for improving hardware device operation by generating evaluation and gating criteria adjustment software code for automatically selecting software applications by mapping software requirements with respect to a hardware device 14. Hardware device 14 includes memory system 8 comprising software applications 17 and software code 28. The memory system 8 may include a single memory system. Alternatively, the memory system 8 may include a plurality of memory systems. Network 7 may include any type of network including, inter alia, a local area network, (LAN), a wide area network (WAN), the Internet, a wireless network, etc.

System 100 enables a process for selecting software applications associated with capabilities and/or requirements for a minimum set of software offerings. Decision based code is generated for verifying that all identified hardware/software based requirements and gated requirements are executed. The decision based code enables a process for generating fine tune gating criteria associated with modifying software based solutions. Additionally, the decision based code enables a mechanism for creating an ordered software set such that a software application is selected according to a width-fit assortment circuit.

System 100 enables the following process:

1. Software selection mapping functions are defined as follows:

An entire set of required software capabilities, functional components, and software processes are represented by a set: $\{F\}$. Additionally, set $\{F\}$ represents a of a component function schematic such that if, C comprises a number of component functions in the function schematic, $\{F\}$ is represented as follows:

$$\{F\} \leftarrow \{F_c | \forall F_i \in \{CBM\} :: i < C\}$$

A set $\{P\}$ represents a set of all software applications such that $P_\alpha$ is a subset of $\{P\}$ defined as follows:

$$\{P_\beta\} \leftarrow \{P_{\beta,i} | \forall P_i \in \{P\} :: \beta = |P_j :: [j]| = |F|; [j] = 1|\}$$

Therefore, an ordered set that has been fitted for width is enabled to select a best software application in accordance with the following assortment function:

$$\{(P_\beta)\} \leftarrow \{P_{sorted} \cap F_c :: \exists \neq \{\emptyset\}, (P_i > P_{i-1} | \forall P_i \in P)\}$$

Additionally, each dimension of P may be defined as functional or non-functional dimensions being captured in a set $\{C\} \leftarrow \{\text{set of all categories}\}$, such that:

$$\{C\} \leftarrow \{Cc | \forall C_i \in \{\text{dimensions}\} :: i < C\}$$

Furthermore, two aspects of software selection are captured as a as the widthFit for ensuring that a final software selection is associated with relevant dimensions required within a software context. The aspects are defined as follows with respect to a set $\{G\}$:

$$\{G\} \leftarrow \{G_j | \forall G_j \in \{D_H, D_L, D_M\} :: [D_H, D_L, D_M] = 1; [D_H, D_L, D_M] = 0\}$$

2. Software applications are evaluated as follows:

For each software application in set $\{P\}$, an associated score is compared with respect to gating requirements as identified in the above equation for set $\{G\}$. The comparison is executed via a Cartesian product algorithm. Results of the algorithm are stored in a set of applications comprising gated categories as follows:

$$\{PGC_{ij}\} \leftarrow \{PXG :: (P_i, G_j > P_{i-1}, G_{j-1} | \forall P_i \geq G_j, G_j \equiv (D_H, D_L, D_M))\}$$

Therefore, each software application is evaluated and ordered within a set as follows:

$$\{P_{sorted}\} \leftarrow \{PGC :: PGC_{ij} \leftrightarrow \text{sort}(D_H, D_L, D_M)\}$$

3. A widthFit assortment process is executed as follows:
Two sets $P_{width}$ are identified and derived as follows:

$$\{(P_{width})\} \leftarrow \{P_{sorted} \cap F_c :: \exists P \neq \{\emptyset\}, (P_i > P_{i-1} | \forall P_i \in P)\}$$

4. A selection map fitment score is calculated as follows:

$$FitMap\% = \left\| \frac{\{G_j\} - \{(P_{width})_j\}}{\{G_j\}} :: \forall j \leq C, \forall P_{width} \in \{P\} \right\|$$

Figure 2:
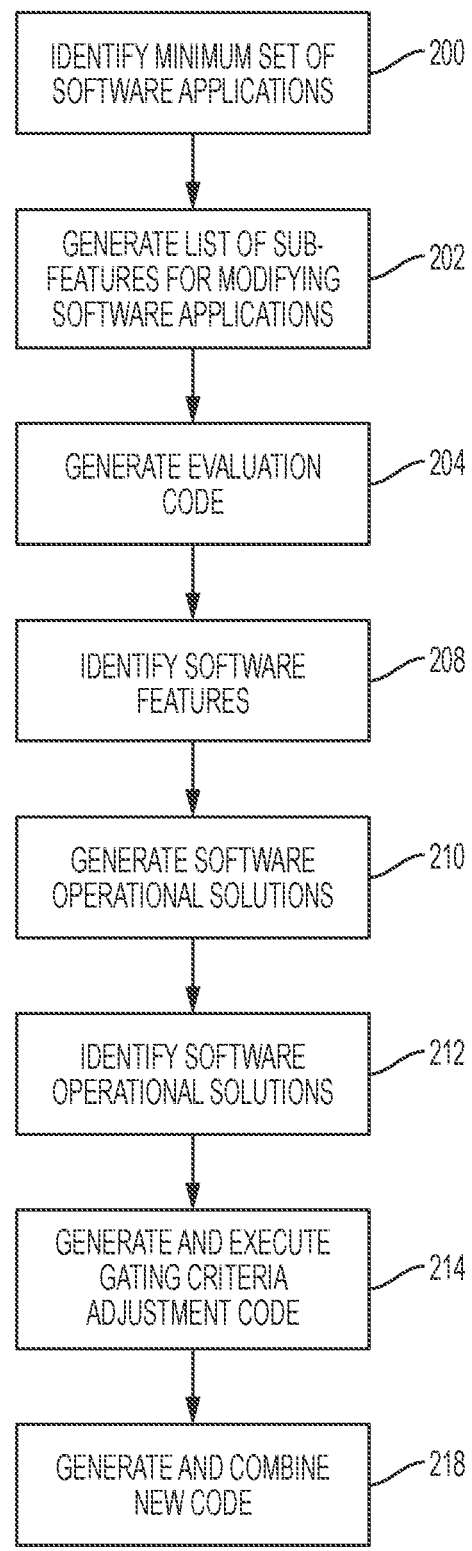
FIG. 2 illustrates an algorithm detailing a process flow enabled by the system of FIG. 1 for improving hardware device operation by generating evaluation and gating criteria adjustment software code for automatically selecting software applications by mapping software requirements with respect to a hardware device, in accordance with embodiments of the present invention.

FIG. 2 illustrates an algorithm detailing a process flow enabled by system 100 of FIG. 1 for improving hardware device operation by generating evaluation and gating criteria adjustment software code for automatically selecting software applications by mapping software requirements with respect to a hardware device, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server 23, database system 21, and/or hardware device 14 of FIG. 1. In step 200, a minimum set of software applications associated with requirements of processes executed by a hardware device with respect to an IT system are identified. The requirements are comprised by metadata. The minimum set of software applications have been pre-tested for accurate functionality with respect to performing the processes executed by the hardware device with respect to the IT system. In step 202, a list of sub-features and a minimum fitment criteria associated with software based solutions for modifying the minimum set of software applications is generated based on results of step 200. In step 204, evaluation code for evaluating available software applications (i.e., for evaluating performance variables of the software features) of the minimum set of software applications is generated with respect to features of the list of sub-features associated with specified fitment scores. In step 208, software features for each available software application are identified. In step 210, generating software operational solutions for each available software application are generated in response to mapping associated data structures to specialized memory devices. Mapping the associated data structures to the specialized memory devices may include mapping the requirements to capabilities of the software applications of the minimum set of software applications. In step 212, a software operational solution of the software operational solutions is identified. The software operational solution includes all available features (of the software features) associated with the minimum set of software applications and comprising a greater number of features than any other software application of the minimum set of software applications. In step 214, gating criteria adjustment code for selecting additional software applications is generated and executed resulting in improved operation of the hardware device. Improved operation of the hardware device may include, inter alia, an improved processing speed for a processor, an improved memory structure of the hardware device, etc. An improved memory structure enables an improved access speed for accessing data within the improved memory structure via an internal layered structure of the improved memory structure. In step 218, executable code is generated and executed resulting in modifying software applications of the minimum set of software applications with respect to improving an efficiency and accuracy of the software applications of the minimum set of software applications. Additionally, additional executable code is generated in response to executing the executable code. The additional executable is combined with the software applications of the minimum set of software applications resulting in improving the efficiency and accuracy of the software applications of the minimum set of software applications.

FIG. 3 illustrates execution of step 202 of FIG. 2 for generating a list of sub-features and a minimum fitment (i.e., gating) criteria associated with software based solutions for modifying a minimum set of software applications, in accordance with embodiments of the present invention. Execution of step 202 results in the generation of gating criteria 304 for each of features 302 and sub-features 308. Gating criteria 302 gating criteria for each feature is defined and measurable for evaluation from unstructured data repositories.

Figure 4:
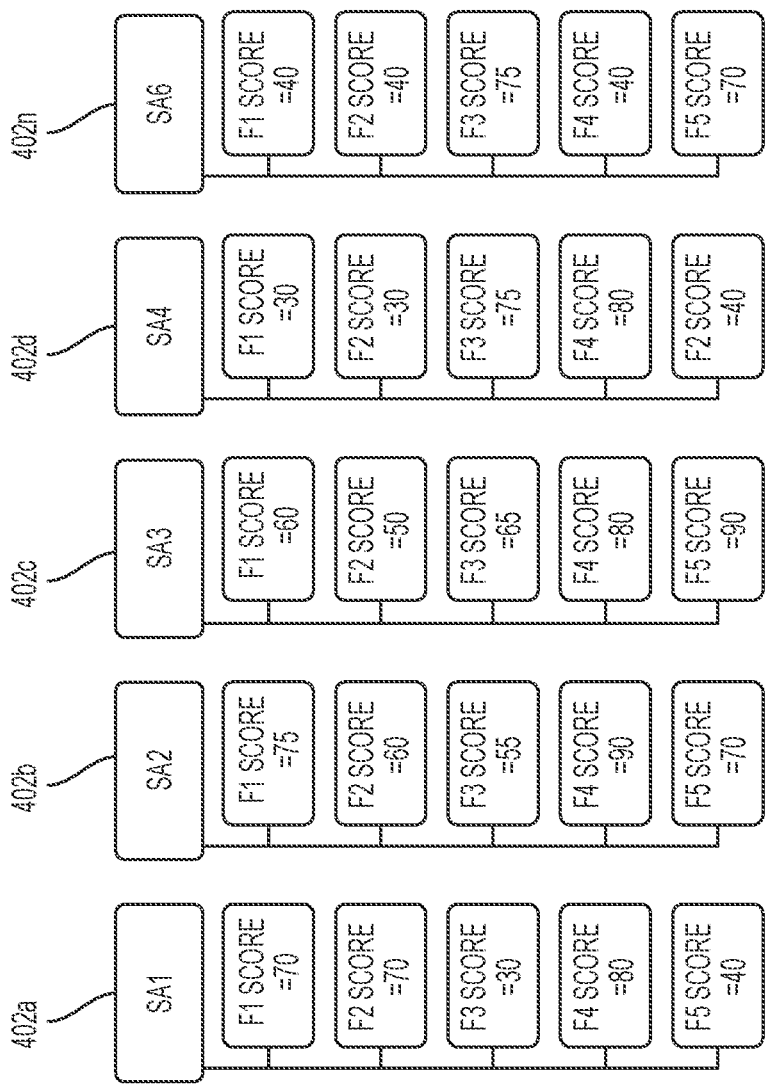
FIG. 4 illustrates execution of a step of FIG. 2 for generating evaluation code for evaluating available software applications of minimum set of software applications, in accordance with embodiments of the present invention.

FIG. 4 illustrates execution of step 204 of FIG. 2 for generating evaluation code for evaluating available software applications 402a . . . 402n (i.e., for evaluating performance variables of the software features) of the minimum set of software applications, in accordance with embodiments of the present invention. Execution of step 204 results in a process for evaluating the available software applications 402a . . . 402n with respect to each required software feature F1 . . . F5 to determine an associated fitment score with respect to code evaluated data repositories such that key sub features are evaluated with respect to software applications performance. The evaluation code is executed to generate a quantitate fitment score for each software feature F1 . . . F5 with respect to each of software applications 402a . . . 402n. Each fitment score includes sentiments for existing software application users with respect to selected software features.

Figure 5:
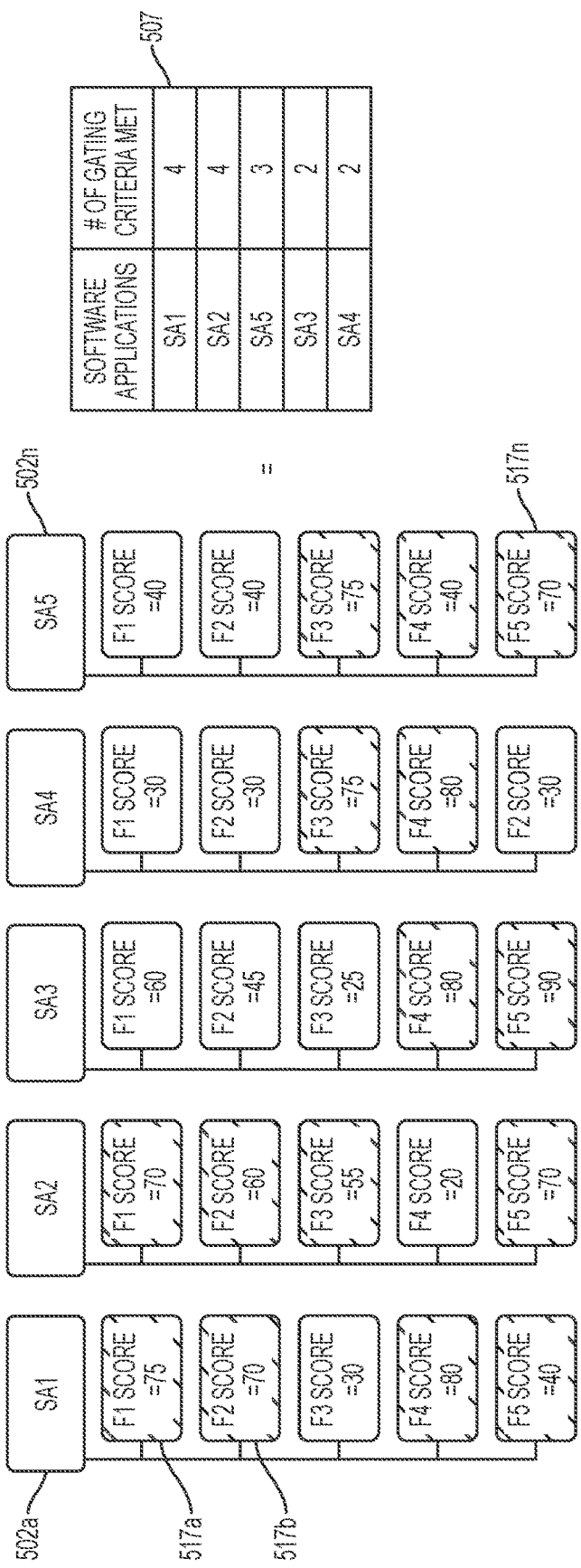
FIG. 5 illustrates execution of a step of FIG. 2 for identifying a software operational solution, in accordance with embodiments of the present invention.

FIG. 5 illustrates execution of step 212 of FIG. 2 for identifying a software operational solution, in accordance with embodiments of the present invention. Execution of step 212 results in identifying a list 507 of software features F1 . . . F5 for each of software applications 502a . . . 502n that have been fulfilled by successfully addressing gating criteria for each software feature. Each software feature (of software features F1 . . . F5) fulfilled by a software application is marked as pass 517a . . . 517n for the associated feature. A software application associated with a greatest number of features, with respect to defined gating criteria, comprise top candidates for width fit evaluation process.

Figure 6:
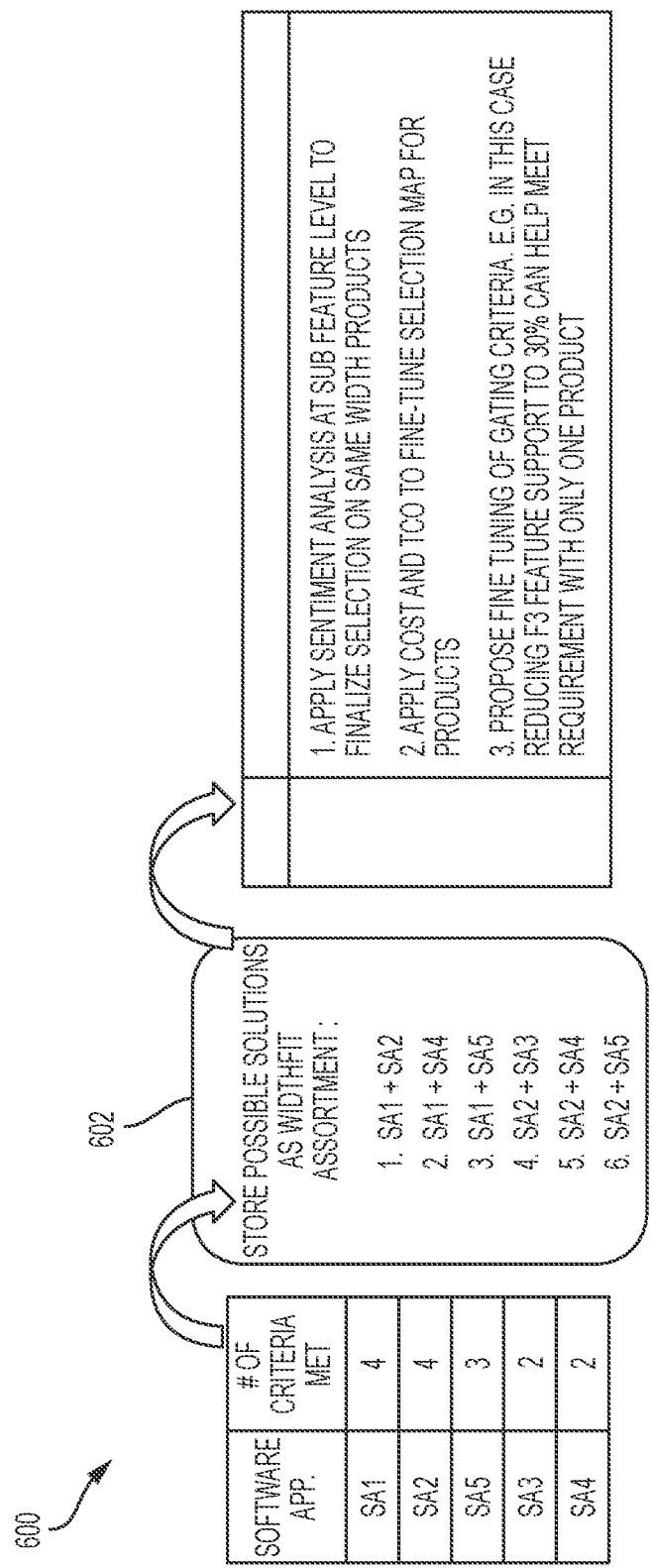
FIG. 6 illustrates execution of a step of FIG. 2 for generating and executing gating criteria adjustment code for selecting additional software applications resulting in improved operation of a hardware device, in accordance with embodiments of the present invention.

FIG. 6 illustrates execution of step 214 of FIG. 2 for generating and executing gating criteria adjustment code for selecting additional software applications resulting in improved operation of a hardware device, in accordance with embodiments of the present invention. Execution of step 214 results in generating possible hardware/software solution options based on execution of a selection mapping technique 600 comprising a software mapping executed for storing the possible hardware/software solution options 602. Each hardware/software option is associated with all given software features with respect to applicable gating criteria defined for each software feature. Each software application (associated with a maximum width) is included with an associated hardware/software solution option and associated with an additional software application providing at least one software feature that has not been provided. In response, a best hardware/software solution option is selected from additional identified hardware/software solution options associated with all software features associated with a minimum amount of software products. Additionally, adjustment recommendations for adjusting gating criteria for minimizing a number of software products are generated.

Figure 7:
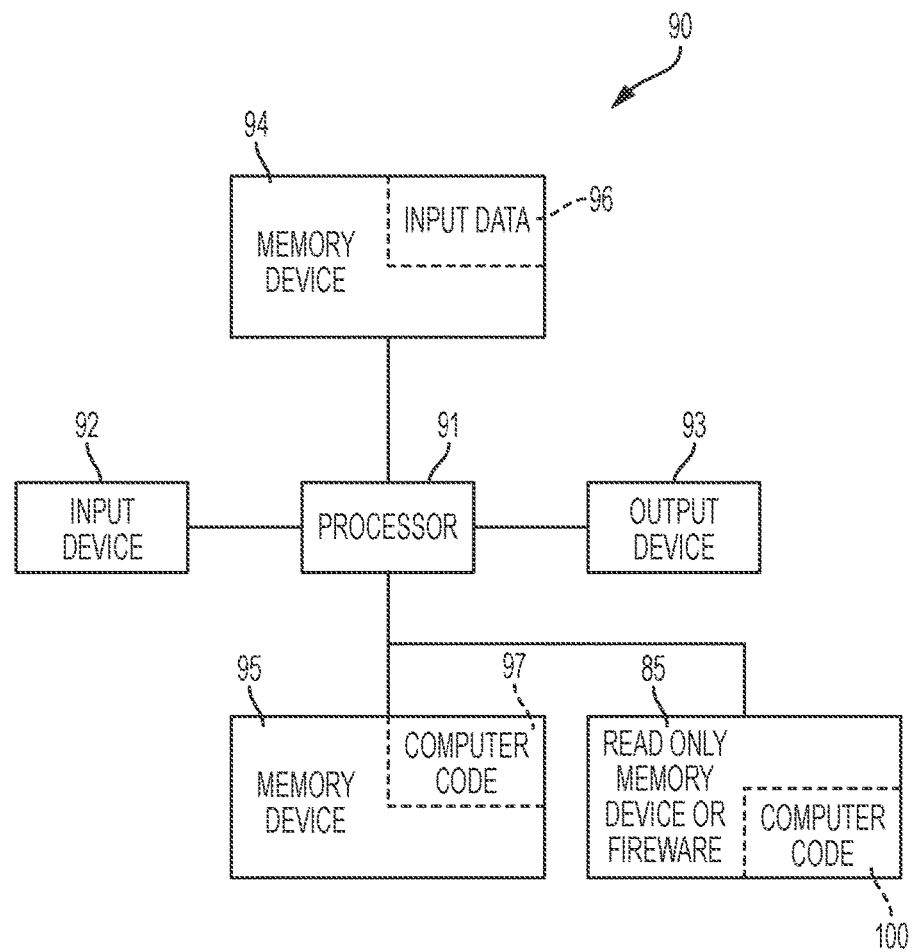
FIG. 7 illustrates a computer system used by the system of FIG. 1 for enabling a process for improving hardware device operation by generating evaluation and gating criteria adjustment software code for automatically selecting software applications by mapping software requirements with respect to a hardware device, in accordance with embodiments of the present invention.

FIG. 7 illustrates a computer system 90 (e.g., server 23, database system 21, and hardware device 14 of FIG. 1) used by or comprised by the system of FIG. 1 for improving hardware device operation by generating evaluation and gating criteria adjustment software code for automatically selecting software applications by mapping software requirements with respect to a hardware device, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 6 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving hardware device operation by generating evaluation and gating criteria adjustment software code for automatically selecting software applications by mapping software requirements with respect to a hardware device. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve hardware device operation by generating evaluation and gating criteria adjustment software code for automatically selecting software applications by mapping software requirements with respect to a hardware device. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving hardware device operation by generating evaluation and gating criteria adjustment software code for automatically selecting software applications by mapping software requirements with respect to a hardware device. In another embodiment, the invention provides a business method that performs the process steps of the invention on a subscription, advertising, and/or fee basis. That is, a service supplier, such as a Solution Integrator, could offer to enable a process for improving hardware device operation by generating evaluation and gating criteria adjustment software code for automatically selecting software applications by mapping software requirements with respect to a hardware device. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated IT system operational improvement method comprising:
   identifying, by a processor of a hardware device of an IT system, a minimum set of software applications associated with requirements of processes executed by said hardware device with respect to said IT system, wherein said requirements are comprised by metadata;
   generating, by said processor based on results of said identifying, a list of sub-features and a minimum fitment criteria associated with software based solutions for modifying said minimum set of software applications;
   generating, by said processor based on said software based solutions and analyzed database systems, evaluation code for evaluating available software applications of said minimum set of software applications with respect to features of said list of sub-features associated with specified fitment scores;
   identifying, by said processor, software features for each available software application of said available software applications;
   generating, by said processor in response to mapping associated data structures to specialized memory devices, software operational solutions for each said available software application;
   identifying, by said processor, a software operational solution of said software operational solutions, said software operational solution comprising all available features of said software features associated with said minimum set of software applications and comprising a greater number of features than any other software application of said minimum set of software applications;
   generating, by said processor based on said software operational solution, gating criteria adjustment code for selecting additional software applications of said minimum set of software applications; and
   executing, by said processor, said gating criteria adjustment code resulting in improved operation of said hardware device.

2. The method of claim 1, further comprising:
   generating, by said processor, executable code associated with said software operational solution;
   executing, by said processor, said executable code resulting in modifying software applications of said minimum set of software applications with respect to improving an efficiency and accuracy of said software applications of said minimum set of software applications;
   generating, by said processor in response to said executing, additional executable code; and
   combining, by said processor, said additional executable with said software applications of said minimum set of software applications resulting in said improving said efficiency and accuracy of said software applications of said minimum set of software applications.

3. The method of claim 1, wherein said generating said evaluation code comprises:
   evaluating performance variables of said software features.

4. The method of claim 1, wherein said requirements are associated with said software applications of said minimum set of software applications.

5. The method of claim 1, wherein said mapping said associated data structures to said specialized memory devices comprises mapping said requirements to capabilities of said software applications of said minimum set of software applications.

6. The method of claim 1, wherein said improved operation of said hardware device comprises an improved processing speed for said processor.

7. The method of claim 1, wherein said improved operation of said hardware device comprises an improved memory structure of said hardware device, and wherein said improved memory structure enables an improved access speed for accessing data within said improved memory structure via an internal layered structure of said improved memory structure.

8. The method of claim 1, further comprising:
   providing at least one support service for at least one of creating, integrating, hosting, maintaining, and deploying computer-readable code in the control hardware, said code being executed by the computer processor to implement: said identifying said minimum set of software applications, said generating said list of sub-features, said generating said evaluation code, said identifying said software features, said generating said software operational solutions, said identifying said software operational solution, said generating said gating criteria adjustment code, and said executing.

9. A computer program product, comprising a computer readable hardware storage device storing a computer readable program code, said computer readable program code comprising an algorithm that when executed by a processor of a hardware device of an IT system implements an automated IT system operational improvement method, said method comprising:
   identifying, by said processor, a minimum set of software applications associated with requirements of processes executed by said hardware device with respect to said IT system, wherein said requirements are comprised by metadata;
   generating, by said processor based on results of said identifying, a list of sub-features and a minimum fitment criteria associated with software based solutions for modifying said minimum set of software applications;
   generating, by said processor based on said software based solutions and analyzed database systems, evaluation code for evaluating available software applications of said minimum set of software applications with respect to features of said list of sub-features associated with specified fitment scores;
   identifying, by said processor, software features for each available software application of said available software applications;
   generating, by said processor in response to mapping associated data structures to specialized memory devices, software operational solutions for each said available software application;
   identifying, by said processor, a software operational solution of said software operational solutions, said software operational solution comprising all available features of said software features associated with said minimum set of software applications and comprising a greater number of features than any other software application of said minimum set of software applications;
   generating, by said processor based on said software operational solution, gating criteria adjustment code for selecting additional software applications of said minimum set of software applications; and executing, by said processor, said gating criteria adjustment code resulting in improved operation of said hardware device.

10. The computer program product of claim 9, wherein said method further comprises:

generating, by said processor, executable code associated with said software operational solution;

executing, by said processor, said executable code resulting in modifying software applications of said minimum set of software applications with respect to improving an efficiency and accuracy of said software applications of said minimum set of software applications;

generating, by said processor in response to said executing, additional executable code; and combining, by said processor, said additional executable with said software applications of said minimum set of software applications resulting in said improving said efficiency and accuracy of said software applications of said minimum set of software applications.

11. The computer program product of claim 9, wherein said generating said evaluation code comprises:

evaluating performance variables of said software features.

12. The computer program product of claim 9, wherein said requirements are associated with said software applications of said minimum set of software applications.

13. The computer program product of claim 9, wherein said mapping said associated data structures to said specialized memory devices comprises mapping said requirements to capabilities of said software applications of said minimum set of software applications.

14. The computer program product of claim 9, wherein said improved operation of said hardware device comprises an improved processing speed for said processor.

15. The computer program product of claim 9, wherein said improved operation of said hardware device comprises an improved memory structure of said hardware device, and wherein said improved memory structure enables an improved access speed for accessing data within said improved memory structure via an internal layered structure of said improved memory structure.

16. A hardware device of an IT system comprising a processor coupled to a computer-readable memory unit, said memory unit comprising instructions that when executed by the computer processor implements an automated IT system operational improvement method comprising:

identifying, by said processor, a minimum set of software applications associated with requirements of processes executed by said hardware device with respect to said IT system, wherein said requirements are comprised by metadata;

generating, by said processor based on results of said identifying, a list of sub-features and a minimum fitment criteria associated with software based solutions for modifying said minimum set of software applications;

generating, by said processor based on said software based solutions and analyzed database systems, evaluation code for evaluating available software applications of said minimum set of software applications with respect to features of said list of sub-features associated with specified fitment scores;

identifying, by said processor, software features for each available software application of said available software applications;

generating, by said processor in response to mapping associated data structures to specialized memory devices, software operational solutions for each said available software application;

identifying, by said processor, a software operational solution of said software operational solutions, said software operational solution comprising all available features of said software features associated with said minimum set of software applications and comprising a greater number of features than any other software application of said minimum set of software applications;

generating, by said processor based on said software operational solution, gating criteria adjustment code for selecting additional software applications of said minimum set of software applications; and executing, by said processor, said gating criteria adjustment code resulting in improved operation of said hardware device.

17. The hardware device of claim 16, wherein said method further comprises:

generating, by said processor, executable code associated with said software operational solution;

executing, by said processor, said executable code resulting in modifying software applications of said minimum set of software applications with respect to improving an efficiency and accuracy of said software applications of said minimum set of software applications;

generating, by said processor in response to said executing, additional executable code; and combining, by said processor, said additional executable with said software applications of said minimum set of software applications resulting in said improving said efficiency and accuracy of said software applications of said minimum set of software applications.

18. The hardware device of claim 16, wherein said generating said evaluation code comprises:

evaluating performance variables of said software features.

19. The hardware device of claim 16, wherein said requirements are associated with said software applications of said minimum set of software applications.

20. The hardware device of claim 16, wherein said mapping said associated data structures to said specialized memory devices comprises mapping said requirements to capabilities of said software applications of said minimum set of software applications.

* * * * *